Nov. 29, 1960 M. G. SISEMORE 2,962,117
VACUUM CLEANER
Filed Nov. 3, 1958
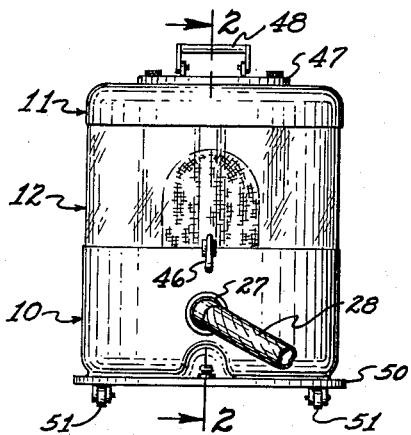
Fig. 1
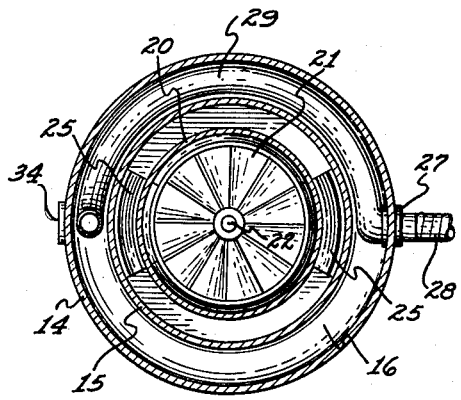
Fig. 3
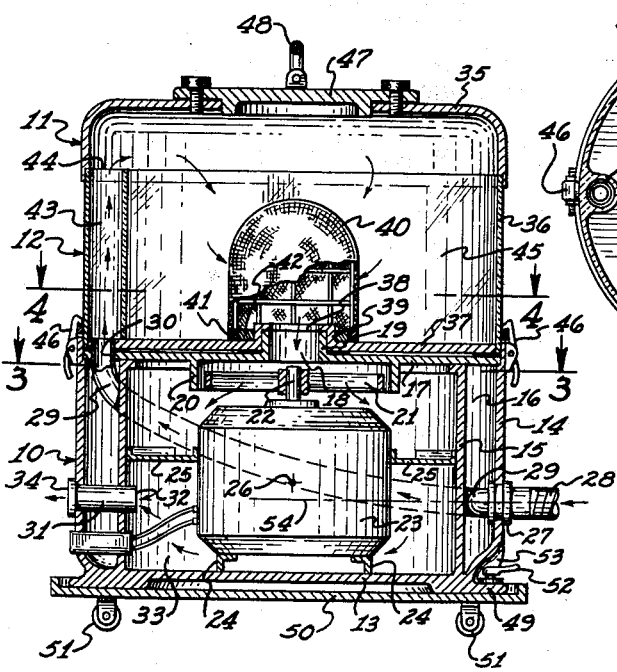
Fig. 2
Fig. 4
INVENTOR.
MARSHALL G. SISEMORE.
BY
Willard S. Grover
ATTORNEY.

United States Patent Office 2,962,117
Patented Nov. 29, 1960

2,962,117
VACUUM CLEANER

Marshall G. Sisemore, 900 E. Roma, Phoenix, Ariz.

Filed Nov. 3, 1958, Ser. No. 771,427

2 Claims. (Cl. 183—37)

This invention pertains to improvements in vacuum cleaners and is particularly directed to an improved vertical canister-type vacuum cleaner.

One of the objects of this invention is to provide a vacuum cleaner which can be easily and safely moved about without danger of tipping over and without excessive effort on the part of the operator being required.

Another object of this invention is to provide a vacuum cleaner having a transparent dirt collecting receptacle which is easily visible at all times and under any condition of operation of the cleaner.

It is a further object of this invention to provide a vacuum cleaner having the transparent dirt collecting receptacle arranged to be readily removable for emptying and cleaning.

Further features and advantages of this invention will appear from a detailed description of the drawings in which:

Fig. 1 is a front elevation of a vacuum cleaner incorporating the features of this invention.

Fig. 2 is a vertical enlarged section on the line 2—2 of Fig. 1.

Fig. 3 is a section on the line 3—3 of Fig. 2.

Fig. 4 is a section on the line 4—4 of Fig. 2.

As an example of one embodiment of this invention there is shown a vacuum cleaner comprising the lower section 10, the upper section 11, and the transparent intermediate section 12. The lower section 10 comprises a bottom 13 around the outer edge of which rises the cylindrical outside casing 14. The motor casing 15 also rises from the bottom 13 and is inwardly spaced from the cylindrical outside casing 14 to provide an air tube space 16 therebetween. The upper edges of casings 14 and 15 terminate in a horizontally disposed baffle 17 having a centrally disposed air inlet opening 18 having an upwardly projecting lip 19 and a downwardly projecting annular ring 20 which surrounds the suction fan 21 carried on the vertically disposed motor shaft 22 of the main drive motor 23 which is suitably mounted by appropriate brackets 24 and 25 respective on the bottom 13 and motor casing 15 in such a manner that the center of gravity 26 of the motor 23 is closely adjacent the bottom 13 of the lower section 10 of the vacuum cleaner.

An air inlet socket 27 is provided near the bottom of the casing 14 to which may be demountably connected the usual vacuum cleaner hose 28. A semi-circular air tube 29 located in the air tube space is connected to the air inlet socket 27 and to a discharge outlet 30 in the baffle 17. An air exit tube 31 communicates at its inner end 32 with the motor compartment 33 defined by the bottom 13, the motor casing 15, and the baffle 17 and discharges outside the outside casing 14 through a suitable filter 34 demountably connected to the outer end of the air exit tube 31.

The upper section 11 comprises the cover piece 35 to the lower edge of which is secured the transparent cylindrical member 36, the lower edge of which terminates in a baffle 37 having an outlet opening 38 surrounded by a socket portion 39 adapted to be aligned with and receive the upwardly extending lip 19 of the air inlet 18 in baffle 17. A dome-shaped main air filter 40 has a suitable base 41 which is demountably connected to the filter connection ring 42 fixed around the outlet socket portion 39 of the baffle 37. Formed integral with the transparent cylindrical member 36 at the outer edge thereof is a vertical air passageway 43 which is aligned with the discharge outlet 30 in the baffle 17 and has a discharge opening 44 in its top end opening into the cover piece 35 which in turn forms part of the dust collecting chamber 45 of the transparent section of the vacuum cleaner.

Suitable clamps 46 may be utilized to secure the upper sections 11 and 12 to the lower section 10. An access cover 47 is provided in the top of the upper cover piece 35 for servicing the filter 40 and for dumping the materials accumulated in the dust collecting chamber 45. A suitable carrying handle 48 may be provided on the cover piece 35 to facilitate the manipulation of the vacuum cleaner.

In certain instances where it is desirable to increase the portability of the unit, a base plate 49 may be attached to the lower section 10 of the vacuum cleaner and this base plate 49 in turn rests in the dolly member 50 which is mounted on suitable casters 51 for easy movement over the floor surface. A suitable foot switch 52 may be mounted on the base plate 49 within the recess 53 formed in the outside casing 14.

With the vacuum cleaner in operation with the motor 23 running, air is sucked in through the hose 28 and through the air tube 29 and then upwardly at high velocity through the transparent passageway 43 where dirt, dust and particles may readily be observed in rapid motion so that the proper operation of the cleaner can be noted. A lack of high velocity movement of matter in this passageway indicates one or both of the filters 34 and 40 are clogged, usually with very fine dust.

Discharge from the discharge opening then enters chamber 45 where heavy solids collect on the top surface of the baffle 37 and the finer dusts accumulate on the filter 40 where the amount of this material collected can be readily observed through the transparent cylindrical member 36. Filtered air then passed downwardly through openings 38 and 18 and through the suction fan 21 into the motor compartment 33 from where it discharges out through the air exit tube 31 and the filter 34.

It is important to note that the motor 23 is placed with its center of gravity in the lowest possible position in the bottom of the cleaner to prevent tipping over while the hose connection socket on the casing 14 is located at or below this center of gravity 26 as indicated by the line 54 so that great ease of handling in pulling the unit about with the hose is thus provided. Further, it will be noted that the observing tube 43 as well as the transparent cylindrical member is located high up near the top of the unit where it receives good natural illumination and is much easier to view from a much less steep vertical angle relative to the cylindrical surface of the member 36 so that a clear view of the matter therein is possible at all times.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letters patent is:

1. A vacuum cleaner comprising, a lower cylindrical section, an upper cylindrical section, a transparent cylindrical intermediate section therebetween, said lower section including a bottom and a cylindrical outside casing upwardly extending from the outer edge of said bottom, a motor casing upstanding from said bottom and inwardly spaced from said lower cylindrical section to provide an air space therebetween wherein the upper edges of said motor casing and said lower cylindrical section terminate integrally with a horizontally disposed baffle, a centrally disposed air inlet opening in said baffle having an upwardly projecting lip, a downwardly projecting annular fan ring on said baffle, a drive motor mounted on the bottom of said lower cylindrical section inside of said motor casing having a vertically disposed motor shaft extending upwardly from said motor, a suction fan fixed on said motor shaft located within said downwardly projecting annular ring of said baffle so that the center of gravity of said drive motor is closely adjacent the bottom of said vacuum cleaner, an air inlet socket in said lower cylindrical section adjacent the bottom thereof adapted to receive the vacuum cleaner suction hose, a semi-circular air tube located in the space between said lower cylindrical section and said motor casing connected at its lower end to said air inlet socket and connected at its upper end to a discharge outlet formed in said baffle, an air exit tube fixed in said lower cylindrical portion and said motor casing communicating with said motor compartment defined by said motor casing, bottom and baffle and discharging to atmosphere, said upper cylindrical section including a cover piece supported on said transparent intermediate section, a second horizontal baffle fixed to the lower edge of said transparent intermediate cylindrical section having an outlet opening aligned with and receiving said upwardly extending lip as said air inlet in said first mentioned baffle, a dome-shaped air filter having a base demountably connected to said second baffle around the outlet opening thereof, a transparent vertical air passage formed integral with said transparent cylindrical intermediate section adjacent the outer edge thereof and located in alignment with said discharge outlet in said first mentioned baffle, the upper end of said transparent air passage having a discharge opening opening into said cover piece, and clamp device for demountably securing the lower edge of said transparent cylindrical intermediate section to the top edge of said lower cylindrical section.

2. In a vacuum cleaner as set forth in claim 1 wherein there is provided an access cover in said top of said upper cover piece for servicing said filter and dumping the materials in the vacuum cleaner.

References Cited in the file of this patent

UNITED STATES PATENTS

| | | |
|---|---|---|
| 1,219,756 | Jones | Mar. 20, 1917 |
| 2,034,373 | Bilde | Mar. 17, 1936 |
| 2,327,810 | McAnerney | Aug. 24, 1943 |
| 2,388,280 | Nuffer | Nov. 6, 1945 |
| 2,684,125 | Brace | July 20, 1954 |

FOREIGN PATENTS

| | | |
|---|---|---|
| 597,917 | Germany | June 4, 1934 |